United States Patent
Yao et al.

(10) Patent No.: US 12,256,369 B2
(45) Date of Patent: Mar. 18, 2025

(54) TRANSMISSION OF NOMINAL REPETITIONS OF DATA OVER AN UNLICENSED SPECTRUM

(71) Applicant: Apple Inc., Cupertino, CA (US)

(72) Inventors: Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Oghenekome Oteri, San Diego, CA (US); Sigen Ye, Whitehouse Station, NJ (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,636

(22) PCT Filed: Aug. 5, 2020

(86) PCT No.: PCT/CN2020/107245
§ 371 (c)(1),
(2) Date: Sep. 21, 2021

(87) PCT Pub. No.: WO2022/027390
PCT Pub. Date: Feb. 10, 2022

(65) Prior Publication Data
US 2023/0156674 A1 May 18, 2023

(51) Int. Cl.
*H04W 72/0446* (2023.01)
*H04L 1/08* (2006.01)
(Continued)

(52) U.S. Cl.
CPC .......... *H04W 72/0446* (2013.01); *H04L 1/08* (2013.01); *H04L 5/1469* (2013.01); *H04W 16/14* (2013.01)

(58) Field of Classification Search
None
See application file for complete search history.

(56) References Cited

U.S. PATENT DOCUMENTS 10,637,600 B2    4/2020  Ahn et al.
2020/0367208 A1*  11/2020  Khoshnevisan ...... H04L 5/0048
(Continued)

FOREIGN PATENT DOCUMENTS

CN    107113077 A    8/2017
CN    108989004 A    12/2018
(Continued)

OTHER PUBLICATIONS

U.S. Appl. No. 62/947,543, filed Dec. 13, 2019, MolavianJazi et al., "Beam Management and Coverage Enhancements for Semi-Persistent and Configured Grant Transmissions".*
(Continued)

*Primary Examiner* — Gregory B Sefcheck
(74) *Attorney, Agent, or Firm* — Sterne, Kessler, Goldstein & Fox P.L.L.C.

(57) ABSTRACT

Some aspects of this disclosure relate to apparatuses and methods for implementing transmission of nominal repetitions of data over an unlicensed spectrum. One or more nominal repetitions of data are to be transmitted by a user equipment (UE) over an unlicensed spectrum used for both uplink and downlink transmissions. The one or more nominal repetitions of the data are segmented into multiple actual repetitions of portions of the data. The UE identifies an orphan symbol in an actual repetition of the multiple actual repetitions of portions of the data, and determines a filler
(Continued)

symbol to replace the orphan symbol in the actual repetition. In addition, the UE transmits the multiple actual repetitions including the filler symbol in replacement of the orphan symbol to a base station over the unlicensed spectrum.

20 Claims, 7 Drawing Sheets

(51) Int. Cl.
*H04L 5/14* (2006.01)
*H04W 16/14* (2009.01)

(56) References Cited

U.S. PATENT DOCUMENTS

| | | | |
|---|---|---|---|
| 2021/0091890 A1 | 3/2021 | Ren et al. | |
| 2021/0184812 A1* | 6/2021 | MolavianJazi | H04L 1/0041 |
| 2021/0203397 A1* | 7/2021 | Xiong | H04W 72/046 |
| 2021/0337428 A1* | 10/2021 | Li | H04L 5/0046 |
| 2021/0360421 A1* | 11/2021 | Wang | H04W 16/14 |
| 2021/0360616 A1* | 11/2021 | Yi | H04L 5/0012 |
| 2022/0046671 A1* | 2/2022 | Yang | H04L 5/0044 |
| 2022/0086872 A1* | 3/2022 | Shimezawa | H04L 5/0039 |
| 2022/0150928 A1* | 5/2022 | Choi | H04L 1/08 |
| 2022/0191903 A1* | 6/2022 | Bae | H04L 1/1893 |
| 2023/0024437 A1* | 1/2023 | Zhang | H04W 72/1263 |
| 2023/0041603 A1* | 2/2023 | Cirik | H04B 7/088 |
| 2023/0046727 A1* | 2/2023 | Jung | H04W 72/1268 |
| 2023/0059757 A1* | 2/2023 | Matsumura | H04W 16/28 |
| 2023/0061726 A1* | 3/2023 | Jung | H04L 5/0094 |
| 2023/0072427 A1* | 3/2023 | Jung | H04B 7/0617 |
| 2023/0074086 A1* | 3/2023 | Yi | H04L 1/1822 |
| 2023/0077060 A1* | 3/2023 | Guo | H04W 72/1268 |
| 2023/0086798 A1* | 3/2023 | Matsumura | H04B 7/0617 370/329 |
| 2023/0102651 A1* | 3/2023 | Takahashi | H04L 1/08 370/329 |
| 2023/0123957 A1* | 4/2023 | Jung | H04L 1/08 370/329 |
| 2023/0124582 A1* | 4/2023 | Frenne | H04L 5/0012 370/329 |
| 2023/0140213 A1* | 5/2023 | Awadin | H04L 5/0044 370/329 |
| 2023/0217447 A1* | 7/2023 | Guo | H04W 72/21 370/329 |
| 2023/0224874 A1* | 7/2023 | Lin | H04L 5/0044 370/336 |
| 2023/0232380 A1* | 7/2023 | Bhamri | H04L 1/08 370/329 |
| 2023/0247617 A1* | 8/2023 | Matsumura | H04W 72/046 370/329 |
| 2023/0284224 A1* | 9/2023 | Takahashi | H04W 72/566 370/329 |

FOREIGN PATENT DOCUMENTS

| | | |
|---|---|---|
| CN | 110536458 A | 12/2019 |
| WO | WO 2020/143960 A1 | 7/2020 |

OTHER PUBLICATIONS

International Search Report and Written Opinion of the International Searching Authority directed to related International Patent Application No. PCT/CN2020/107245, mailed Apr. 30, 2021; 9 pages.
Nokia: 'Summary of email discussion [100e-NR-Lleng_URLLC-PUSCH_Enh-03] (AI 7.2.5.3)', 3GPP Draft; R1-2001403, 3GPP TSG-RAN WG1 Meeting #100e, e-Meeting, Mar. 2020; 43 pages.
China Unicom: 'PUSCH enhancements for URLLC', 3GPP Draft; R1-1912634, 3GPP TSG RAN WG1 #99, Reno, Nevada, Nov. 2019; 9 pages.
First Office Action and Search Report directed to related Chinese Patent Application No. 202080104396.8, with machine translation attached, mailed Aug. 28, 2024; 18 pages.

* cited by examiner

TRANSMISSION OF NOMINAL REPETITIONS OF DATA OVER AN UNLICENSED SPECTRUM

This application is a U.S. National Phase of International Application No. PCT/CN2020/107245, filed Aug. 5, 2020, which is hereby incorporated by reference in its entirety.

BACKGROUND

Field

The described aspects generally relate to transmission of nominal repetitions of data over an unlicensed spectrum in wireless communications.

Related Art

The 3rd Generation Partnership Project (3GPP) is currently in a full standardization process of New Radio (NR), the Radio Access Technology (RAT) for 5th Generation (5G) systems. 5G wireless communication systems and services can be classified into three categories: ultra-reliable and low latency communication (URLLC), massive machine-type communication (mMTC), and enhanced mobile broadband (eMBB). The design of URLLC is challenging since URLLC accommodates emerging applications having stringent latency and reliability requirements. In order to improve reliability, more resources are used for signaling and retransmission. e.g., transmission of nominal repetitions of data. In addition, to address the rapid increase of wireless data traffic demand, the wireless industry has turned its attention to the unlicensed spectrum as a way to aggregate additional spectrum bands and improve the capacity of future cellular systems. New Radio based access to unlicensed spectrum (NR-U) has many problems to be solved, e.g., support of URLLC in the unlicensed spectrum.

SUMMARY

Some aspects of this disclosure relate to apparatuses and methods for implementing transmission of nominal repetitions of data over an unlicensed spectrum in wireless communications, e.g., a wireless communication system based on 3rd Generation Partnership Project (3GPP) release 15 (Rel-15), release 16 (Rel-16), release 17 (Rel-17), or beyond. For example, systems and methods are provided implementing designs for transmission of nominal repetitions of data for Ultra-Reliable and Low-Latency Communications (URLLC) services in New Radio (NR) based access to unlicensed spectrum (NR-U) in a Time Division Duplexing (TDD) system.

In some examples, the unlicensed spectrum is shared between multiple UEs, and each UE performs listen before talk (LBT) procedure to access the unlicensed spectrum. In some examples, the unlicensed spectrum is a standalone new radio (NR) unlicensed spectrum supporting ultra-reliable low-latency communication (URLLC) with synchronized Frame Based Equipment (FBE) based sharing in controlled environments.

In some examples, a slot includes multiple symbols, where each symbol of the slot has a direction defined as an uplink (UL) symbol for UL transmission, a downlink (DL) symbol for DL transmission, or a flexible symbol to be used for either UL transmission or DL transmission. The directions of symbols in a slot are defined by a subframe indicator (SFI) or by an Invalid Symbol Pattern. An orphan symbol within a slot is determined by a boundary of a slot or a switching point within the slot next to a DL transmission symbol defined the SFI. In some examples, the SFI has a semi-static configuration or a dynamic configuration. Similarly, the Invalid Symbol Pattern is a semi-static configuration or a semi-static configuration indicated by dynamic signaling, where a symbol of a bitmap from the Invalid Symbol Pattern marked in "I" is defined as a symbol unavailable for UL transmission.

Some aspects of this disclosure relate to a user equipment (UE). The UE includes a transceiver configured to communicate over a wireless network with a base station and a processor communicatively coupled to the transceiver. The processor receives, using the transceiver and from the base station, a downlink message including an UL transmission configuration. The UE further transmits data to the base station over an unlicensed spectrum, where the unlicensed spectrum is used for both UL and DL transmissions. In addition, the processor generates multiple actual repetitions of portions of data to be transmitted over an unlicensed spectrum. The multiple actual repetitions of the portions of the data form one or more nominal repetitions of the data, where the one or more nominal repetitions of the data is determined based at least in part on the UL transmission configuration received from the base station. The UL transmission configuration may contain a nominal repetition configuration. The one or more nominal repetitions of the data are segmented into the multiple actual repetitions, where an actual repletion carries a portion of the data. The processor further identifies an orphan symbol of an actual repetition of the multiple actual repetitions. Afterwards, the processor determines a filler symbol to replace the orphan symbol of the actual repetition, and transmits the multiple actual repetitions including the filler symbol in replacement of the orphan symbol to the base station using the transceiver over the unlicensed spectrum.

In some examples, the UL transmission configuration is based at least in part on a radio resource control (RRC) signalling to configure a time domain resource allocation for the UE, based at least in part on an activation downlink control information (DCI), or based at least in part on Medium access control (MAC) Control Element (MAC CE) signaling. Furthermore, transmissions of the one or more nominal repetitions of the data from the UE are physical uplink shared channel (PUSCH) repetition Type B transmissions of the data. An actual repetition may be a PUSCH repetition Type B transmission in a Time Division Duplexing (TDD) NR communication system. In some examples, a PUSCH repetition Type B transmission in a Time Division Duplexing (TDD) NR communication system is used as an example of an actual repetition.

In some examples, the filler symbol may be selected from a last symbol of a previous actual repetition of the data before the actual repetition, a first symbol of a next actual repetition of the data after the actual repetition, a cyclic prefix symbol, or a symbol determined by the UE. In addition, the filler symbol may be transmitted at a frequency location that is the same as a frequency location for the last symbol of the previous actual repetition, or a frequency location for the first symbol of the next actual repetition. Furthermore, the filler symbol is transmitted having a transmission power that is the same as a transmission power for the last symbol of the previous actual repetition, or a transmission power for the first symbol of the next actual repetition.

Some aspects of this disclosure relate to a method. The method includes transmitting data over an unlicensed spectrum to a base station, where the unlicensed spectrum is used for both UL and DL transmissions. The method further includes generating multiple actual repetitions of portions of the data to be transmitted over the unlicensed spectrum, where the multiple actual repetitions of portions of the data and form one or more nominal repetitions of the data. In addition, the method includes identifying an orphan symbol of an actual repetition of the multiple actual repetitions, and determining a filler symbol to replace the orphan symbol of the actual repetition. Afterwards, the method includes transmitting the multiple actual repetitions including the filler symbol in replacement of the orphan symbol to the base station from the UE over the unlicensed spectrum.

Some aspects of this disclosure relate to a non-transitory computer-readable medium storing instructions. When the instructions are executed by a processor of a UE, the instructions cause the processor to perform operations including receiving, by the UE and from a base station, a downlink message including an UL transmission configuration to transmit UL one or more nominal repetitions of data from the UE. The operations further include transmitting, by the UE over an unlicensed spectrum, the data to the base station. The unlicensed spectrum is used for both UL and DL transmissions. The operations further include generating multiple actual repetitions of portions of the data to be transmitted over the unlicensed spectrum, where the multiple actual repetitions of portions of data and form the one or more nominal repetitions of the data. Moreover, the operations include identifying an orphan symbol of an actual repetition of the multiple actual repetitions, and determining a filler symbol to replace the orphan symbol of the actual repetition. Afterwards, the operations include transmitting, by the UE, the multiple actual repetitions including the filler symbol in replacement of the orphan symbol to the base station over the unlicensed spectrum.

Some aspects of this disclosure relate to a base station. The base station includes a transceiver configured to communicate over a wireless network with a UE and a processor communicatively coupled to the transceiver. The processor transmits, using the transceiver and to the UE, a downlink message including an UL transmission configuration. The UL transmission configuration is for the UE to transmit UL one or more nominal repetitions of data from the UE over an unlicensed spectrum, where the unlicensed spectrum is used for both UL and DL transmissions. The processor further receives from the UE an uplink message including an actual repetition containing a filler symbol. The one or more nominal repetitions of the data are segmented into multiple actual repetitions, and the filler symbol is a replacement of an orphan symbol of the actual repetition of the multiple actual repetitions.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
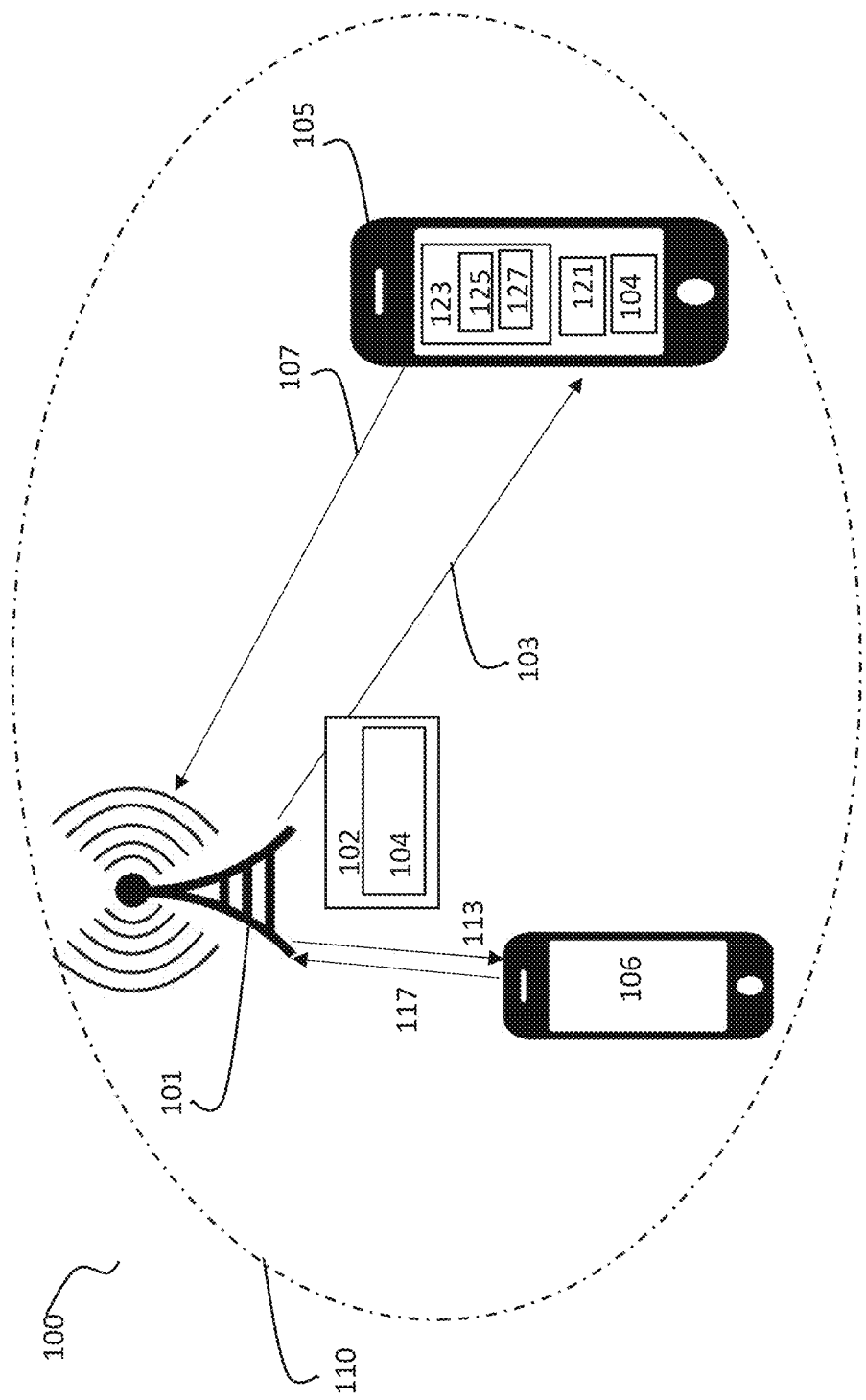
FIG. 1 illustrates an example wireless system implementing designs for transmission of nominal repetitions of data over an unlicensed spectrum, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

In a wireless communication system, a user equipment (UE) communicates with a base station (for example, an evolved Node B (eNB), a next generation node B (gNB), or other base station) over a communication spectrum. To address the rapid increase of wireless data traffic demand in the upcoming years, the wireless industry has turned its attention to the unlicensed spectrum as a way to aggregate additional spectrum bands and improve the capacity of future cellular systems. The unlicensed spectrum having worldwide availability includes the 2.4 GHz, 5 GHz, and 60 GHz bands. An unlicensed spectrum can be used for both uplink (UL) and downlink (DL) transmissions. Moreover, an unlicensed spectrum may be shared between multiple UEs, and each UE performs listen before talk (LBT) procedure to access the unlicensed spectrum.

The 3rd Generation Partnership Project (3GPP) is currently in a full standardization process of New Radio (NR), the Radio Access Technology (RAT) for 5th Generation (5G) systems including ultra-reliable and low latency communication (URLLC), massive machine-type communication (mMTC), and enhanced mobile broadband (eMBB). In order to address the stringent latency and reliability requirements for URLLC, more resources are used for signaling and retransmission, e.g., transmission of nominal repetitions of data. New Radio based access to unlicensed spectrum (NR-U) has many problems to be solved, e.g., support of URLLC in the unlicensed spectrum.

Techniques to enable URLLC services may include small data payloads (e.g. 32 bytes) with short latency. In addition, mini-slot transmission time intervals are used instead of an entire slot so data of URLLC service can be transferred immediately without waiting for a slot boundary. A mini-slot is a part of a slot and a smallest scheduling unit in the wireless communication system.

A slot includes multiple symbols, where each symbol of the slot has a direction defined as a uplink (UL) symbol for UL transmission, a downlink (DL) symbol for DL transmission, or a flexible symbol to be used for either UL transmission or DL transmission. The directions of symbols of a slot may be defined by a subframe indicator (SFI). In some examples, the SFI has a semi-static configuration or a dynamic configuration.

In some examples, one or more nominal repetitions of data are transmitted over an unlicensed spectrum to improve the reliability, e.g., for URLLC services. Transmission of a nominal repetition of data is to re-send the same data that has been transmitted already. In some example, a nominal repetition of data is sent before receiving a feedback or a request. e.g., Hybrid Automatic Repeat Request (HARQ), from the base station. When a size of the data is larger than one symbol, a nominal repetition of data may be segmented into multiple actual repetitions by a slot boundary, a switching point within the slot next to a DL transmission symbol defined by a SFI, by the so-called Invalid Symbol Pattern, or by optionally dynamic signaling related to the Invalid Symbol Pattern that indicates reserved uplink symbol(s). In some examples, an actual repetition can be of a single symbol, which may be called an orphan symbol, while the nominal transmission containing the actual transmission is of more than one symbol.

In some current systems, an orphan symbol may be dropped or omitted in the UL transmission. As will be further discussed in reference to FIG. 2, an orphan symbol is contained in an actual repetition having only one symbol. Dropping an orphan symbol of an actual repetition may not cause a problem in a licensed spectrum. However, dropping an orphan symbol of an actual repetition can be problematic in an unlicensed spectrum or a shared spectrum. An unlicensed spectrum or a shared spectrum may be shared by multiple nodes including UEs and base stations operated in a same operator's network or different operators' networks. When a first UE drops an orphan symbol of an actual repetition, a gap in the slot is created between otherwise continuous transmissions. If a second node, which may be a UE, a base station, or a node from other technologies such as a WiFi station sharing the unlicensed spectrum, is performing LBT procedure, the second node may incorrectly assume the channel is available and starts its transmission. The transmission from a second UE at, or shortly after, the gap created by the dropped orphan symbol may lead to collisions with the first UE's transmissions that resume after the gap.

Some aspects of this disclosure provide improved solutions to transmission of orphan symbols in actual repetitions. In detail, apparatuses and methods are presented for implementing transmissions of nominal repetitions of data over an unlicensed spectrum. Instead of dropping an orphan symbol, a filler symbol is included in the actual repetition to eliminate the potential gap in the slot. Hence, a second UE listening to the shared unlicensed spectrum would not assume the channel is available for transmission. As a result, there is no collision between the first UE and the second UE at the orphan symbol.

In some examples, the filler symbol is selected from a last symbol of a previous actual repetition of the data before the actual repetition, a first symbol of a next actual repetition of the data after the actual repetition, a cyclic prefix symbol, or a symbol determined by the UE. In addition, the filler symbol is transmitted at a frequency location that is the same as a frequency location for the last symbol of the previous actual repetition, or a frequency location for the first symbol of the next actual repetition. Furthermore, the filler symbol is transmitted having a transmission power that is the same as a transmission power for the last symbol of the previous actual repetition, or a transmission power for the first symbol of the next actual repetition.

In some examples, the unlicensed spectrum radio system is a standalone NR unlicensed spectrum radio system supporting URLLC with synchronized Frame Based Equipment (FBE) based sharing in controlled environments. In addition, other unlicensed spectrum radio systems from different operators may operate in the same geographical area, while some of them may also operate with the NR system with FBE based sharing. The unlicensed spectrum radio networks from different operators may have different timing setups, for example in terms of the start time of the fixed frame period, and the duration of the fixed frame period. In some other examples, the unlicensed spectrum may be a NR unlicensed spectrum supporting URLLC in uncontrolled environments. Even though techniques described herein are for unlicensed spectrum as an example, the techniques may be applicable to any other spectrum by multiple network nodes, e.g., UEs, base stations, operated by a same or different network operators.

Although some examples of the contents of transmissions of nominal repetitions of data over an unlicensed spectrum are provided above, the aspects of this disclosure are not limited to these examples and the transmissions of nominal repetitions of data over an unlicensed spectrum can include less, more, or other parameters, instructions, and/or information.

FIG. 1 illustrates an example wireless system 100 implementing designs for transmission of nominal repetitions of data over an unlicensed spectrum, according to some aspects of the disclosure. The wireless system 100 is provided for the purpose of illustration only and does not limit the disclosed aspects. The system 100 may include, but is not limited to, a network node (herein referred to as base station) 101 and electronic devices (hereinafter referred to as UE), e.g., an UE 105, and an UE 106.

According to some aspects, the base station 101 can include a node configured to operate based on a wide variety of wireless communication techniques such as, but not limited to, techniques based on 3GPP standards. For example, base station 101 can include a node configured to operate using Rel-16, Rel-17, or later, and may support URLLC services and applications. The base station 101 can be a fixed station, and may also be called a base transceiver system (BTS), an access point (AP), an access node (AN), a transmission/reception point (TRP), an evolved NodeB (eNB), a next generation node B (gNB), or some other equivalent terminology.

According to some aspects, the UE 105 or the UE 106 can include an electronic device configured to operate based on a wide variety of wireless communication techniques. These techniques can include, but are not limited to, techniques based on 3GPP standards. For example, the UE 105 or the UE 106 can include an electronic device configured to operate using Rel-16, Rel-17 or later, and may support URLLC services and applications. The UE 105 or the UE 106 can include, but is not limited to, a wireless communication device, a smart phone, a laptop, a desktop, a tablet, a personal assistant, a monitor, a television, a wearable device, an Internet of Things (IoTs), a vehicle's communication device, a mobile station, a subscriber station, a remote terminal, a wireless terminal, a user device, or the like.

Figure 6:
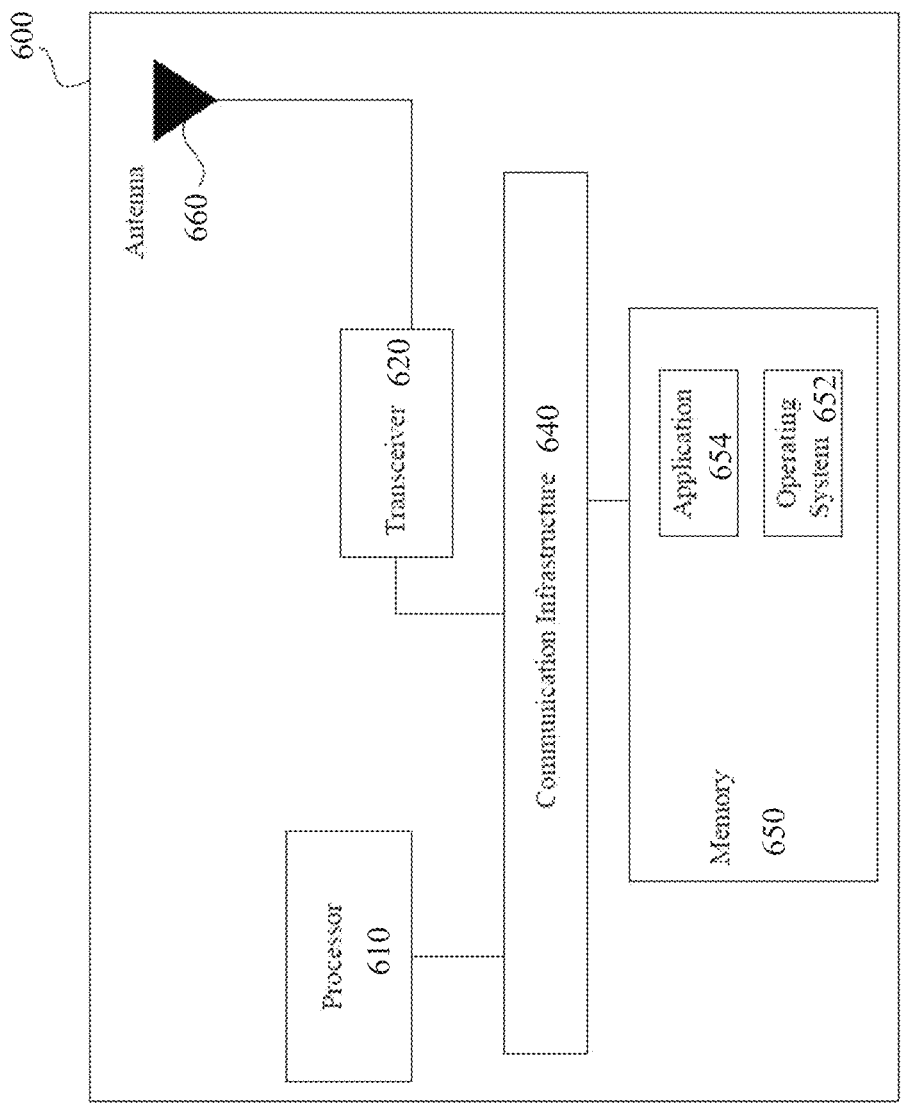
FIG. 6 illustrates a block diagram of an example system of an electronic device implementing designs for transmission of nominal repetitions of data over an unlicensed spectrum, according to some aspects of the disclosure.
Figure 7:
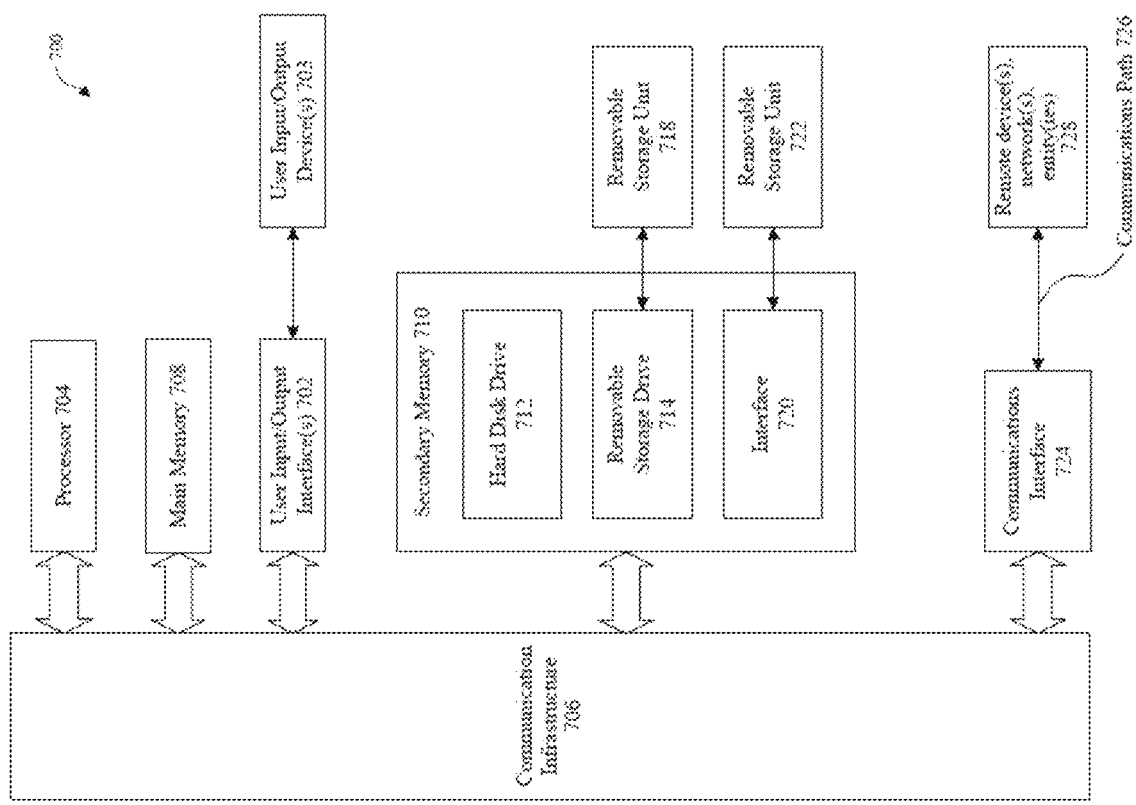
FIG. 7 is an example computer system for implementing some aspects or portion(s) thereof of the disclosure provided herein.

According to some aspects, the UE 105 may include a transceiver configured to wirelessly communicate with the base station 101, and a processor communicatively coupled to the transceiver, as shown in more details in FIGS. 6 and 7. The UE 105 can be connected to and can communicate with the base station 101 using one or more communication links, e.g., a downlink 103 and an uplink 107. Similarly, the UE 106 may include a transceiver configured to wirelessly communicate with the base station 101, and a processor communicatively coupled to the transceiver, as shown in more details in FIGS. 6 and 7. The UE 106 can be connected to and can communicate with the base station 101 using one or more communication links, e.g., a downlink 113 and an uplink 117.

According to some aspects, the downlink 103 and the uplink 107 for the UE 105, and the downlink 113 and the uplink 117 for the UE 106 may share the same unlicensed spectrum used for both UL and DL transmissions. The UE 105 and the UE 106 perform listen before talk (LBT) procedure before accessing the shared unlicensed spectrum to avoid collisions with other UEs occupying the shared unlicensed spectrum. In some examples, the unlicensed spectrum is a standalone NR unlicensed spectrum supporting URLLC with synchronized Frame Based Equipment (FBE) based sharing in a controlled environment 110. In the following, function descriptions are provided for the UE 105 as an example, while the UE 106 may perform the same or similar functions.

According to some aspects, the base station 101 may use an UL transmission configuration 104 to configure the UE 105 to transmit one or more nominal repetitions of data from the UE to the base station 101. The UE 105 receives from the base station 101 a downlink message 102 including the UL transmission configuration 104. In some examples, the UL transmission configuration 104 is based at least in part on a radio resource control (RRC) signalling to configure a time domain resource allocation for the UE, based at least in part on an activation downlink control information (DCI), or based at least in part on Medium access control (MAC) Control Element (MAC CE) signaling. In some examples, the UL transmission configuration 104 may be a Type 1 configured grant, and the RRC signaling alone is used to configure the time domain resource allocation for the UE 105. In addition, the UL transmission configuration 104 may be a Type 2 configured grant, and the RRC signaling together with the DCI activation is used to configure the time domain resource allocation for the UE 105. Furthermore, the RRC signaling together with the MAC CE signaling may be used to configure the time domain resource allocation for the UE 105. Additionally and alternatively, the RRC signaling together with the MAC CE signaling and dynamic signaling from the DCI activation may be used to configure the time domain resource allocation for the UE 105.

According to some aspects, based on the UL transmission configuration 104, the UE 105 may transmit data 121 to the base station 101. In some examples, the UE 105 may transmit data 121 over an unlicensed spectrum to the base station 101 in a Time Division Duplexing (TDD) NR communication system. In order to improve the reliability of the transmission, the data 121 may be transmitted multiple times in nominal repetitions. In some examples, a nominal repetition 123 of the data 121 is generated and sent before receiving a feedback or a request, e.g., Hybrid Automatic Repeat Request (HARQ), from the base station 101. The nominal repetition 123 of the data 121 may be segmented into multiple actual repetitions, e.g., an actual repetition 125, and an actual repetition 127. The actual repetitions may be transmitted UL in different time slots.

Figure 2:
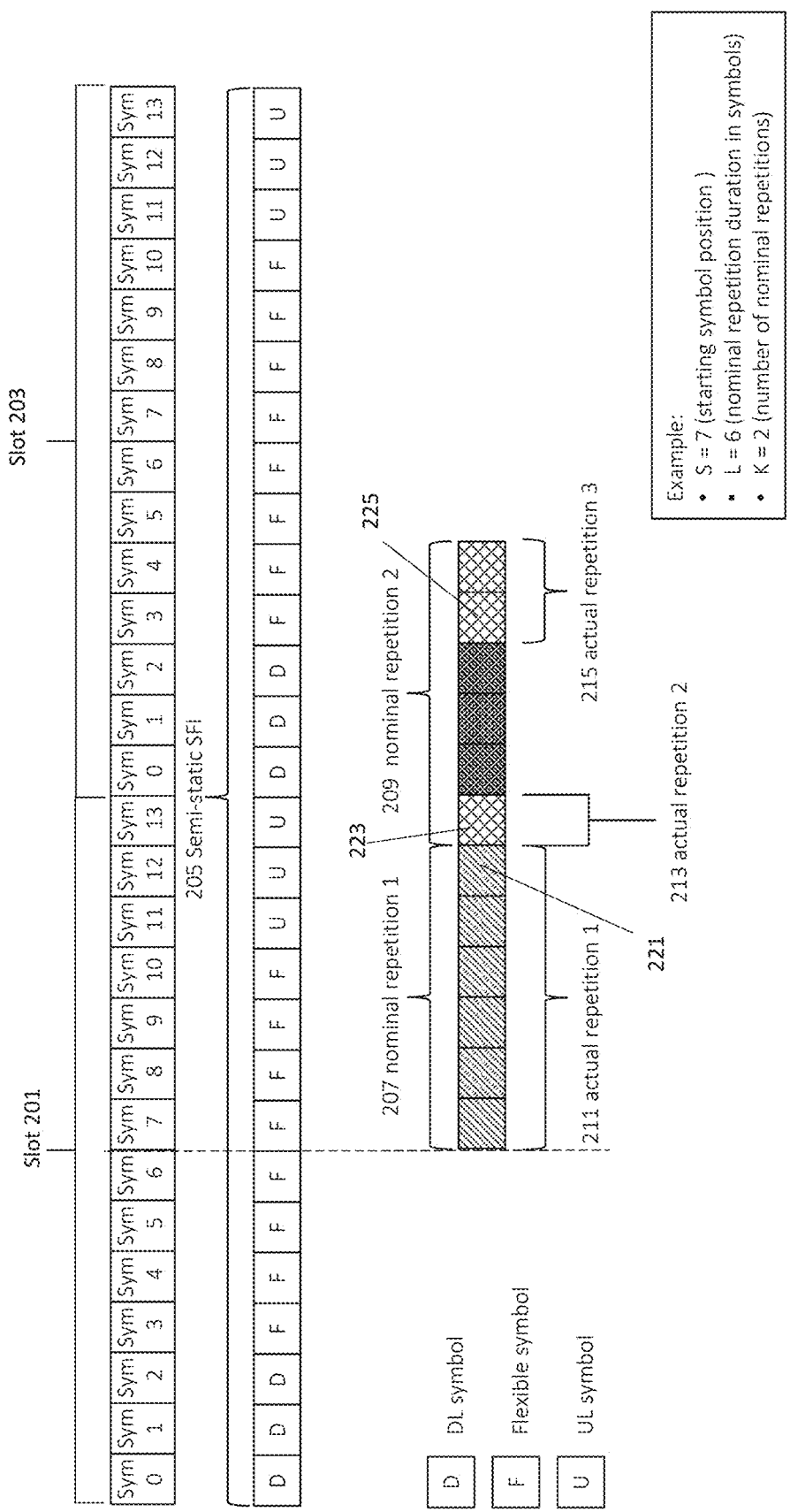
FIG. 2 illustrates examples of nominal repetitions, actual repetitions, and an orphan symbol, according to some aspects of the disclosure.

FIG. 2 illustrates examples of nominal repetitions, actual repetitions, and an orphan symbol, according to some aspects of the disclosure. According to some aspects, for the data 121, the UE 105 generates one or more nominal repetitions to be transmitted over the unlicensed spectrum. e.g., a nominal repetition 207 and a nominal repetition 209 as shown in FIG. 2. The one or more nominal repetitions are segmented into multiple actual transmissions.

As shown in FIG. 2, a slot 201 or a slot 203 includes 14 symbols, where each symbol of the slot has a direction defined as an uplink (UL) symbol for UL transmission, a downlink (DL) symbol for DL transmission, or a flexible symbol to be used for either UL transmission or DL transmission. The directions (UL or DL or Flexible) of symbols of a slot are defined by a SFI 205. In some examples, a SFI may have a semi-static configuration or a dynamic configuration. The SFI 205 as shown is a semi-static SFI. According to the SFI 205, for the slot 201 or the slot 203, symbol 0 to symbol 2 are DL symbols, symbol 3 to symbol 10 are flexible symbols, while symbol 11 to symbol 13 are UL symbols.

In some examples, the data 121 has 6 symbols, which has been transmitted prior to the slot 201. According to the UL transmission configuration 104, two addition nominal repetitions of the data 121, e.g., the nominal repetition 207 and the nominal repetition 209, are scheduled to be transmitted to the base station 101. The nominal repetition 207 is transmitted by an actual repetition 211 during symbol 7 to symbol 12 of the slot 201 that is either a UL symbol or a flexible symbol. The actual repetition 211 has a last symbol 221. The nominal repetition 209 is scheduled to be transmitted in consecutive slots, which should occupy symbol 13 of the slot 201 to symbol 4 of the slot 203. However, the SFI 205 indicates that symbol 0 to symbol 2 of the slot 203 are DL symbols, and cannot be used for UL transmissions. Hence, symbol 0 to symbol 2 of the slot 203 segment the nominal repetition 209 into two actual repetitions, an actual repetition 213 and an actual repetition 215 that are non-adjacent and separated by DL symbols 0-2. The actual repetition 213 contains only one symbol 223 to be transmitted at symbol 13 of the slot 201. The actual repetition 215 contains 2 symbols of the nominal repetition 209, with a first symbol 225.

Accordingly, the nominal repetition 207 and the nominal repetition 209 are segmented into three actual repetitions, the actual repetition 211, the actual repetition 213, and the actual repetition 215. The actual repetition 211 is a previous actual repetition of the data 121 before the actual repetition 213, and the actual repetition 215 is a next actual repetition of the data 121 after the actual repetition 213.

According to some aspects, the UE 105 further identifies or determines an orphan symbol of an actual repetition. As shown in more details in FIG. 2, the actual repetition 213 has only one symbol 223 occupying only one symbol, which is determined by a boundary of the slot 201. In contrast, actual repetitions 211 and 215, each have multiple symbols. Additionally and alternatively, the actual repetition 213 is determined by a switching point within the slot next to a DL transmission symbol defined by the SFI 205, which is symbol 13 since it is next to a DL symbol 0 of the slot 203.

Hence, the symbol 223 is an orphan symbol of the actual repetition 213. Accordingly, herein, an orphan symbol is contained in an actual repetition of size of one symbol, where the actual repetition is a part of a nominal repetition when the nominal repetition is segmented into multiple actual repetitions. Transmission of a nominal repetition of data is to re-send the same data that has been transmitted already for various purposes, e.g., to improve reliability. In some examples, the orphan symbol 223 may be a single symbol to be transmitted in a PUSCH repetition Type B transmission according to a nominal repetition configuration, or a single UL symbol to be omitted from transmission in the PUSCH repetition Type B transmission. In some examples, the orphan symbol 223 is determined by an Invalid Symbol Pattern. The Invalid Symbol Pattern may be a semi-static configuration or a semi-static configuration indicated by dynamic signaling, and a symbol of a bitmap from the Invalid Symbol Pattern marked in "1" is defined as a symbol unavailable for UL transmission.

Conventionally, the orphan symbol 223 may be dropped or omitted in the UL transmission. However, dropping an orphan symbol of an actual repetition can be problematic in an unlicensed spectrum or a shared spectrum. When the UE 105 drops the orphan symbol 223, a gap is created in the slot 201. A second node, e.g., the UE 106, may be performing LBT procedure, and may incorrectly assume the channel is available and starts its transmission. The transmission from the UE 106 at symbol 13 of the slot 201 supposedly occupied by the dropped orphan symbol 223 and beyond symbol 13 may lead to collisions with transmissions from the UE 105 that resume after the gap.

Figure 3:
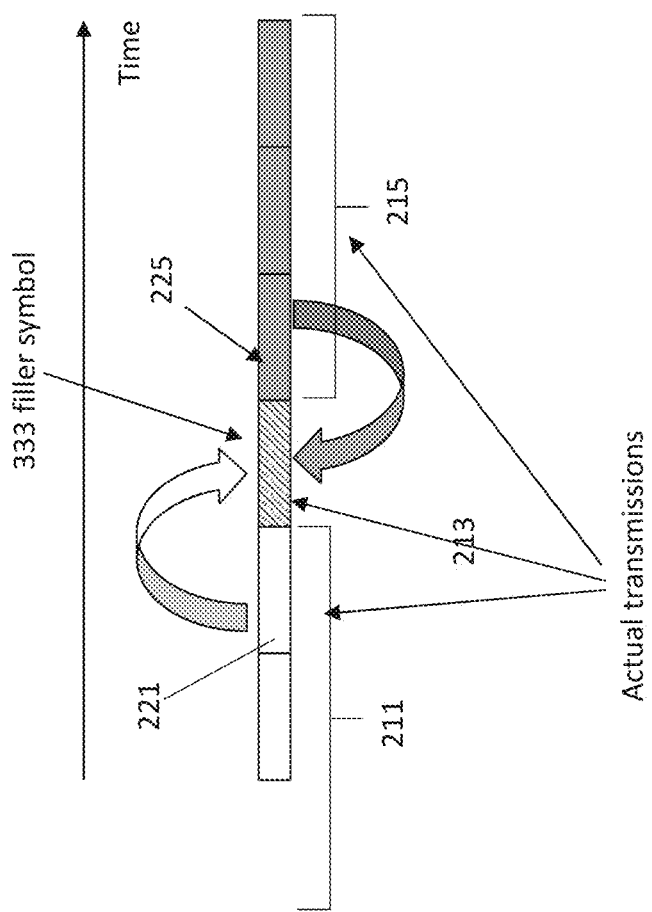
FIG. 3 illustrates an example of a filler symbol to replace an orphan symbol of an actual repetition, according to some aspects of the disclosure.

According to some aspects, the UE 105 further determine a filler symbol 333 to replace the orphan symbol 223 of the actual repetition 213, as shown in more details in FIG. 3. FIG. 3 only shows part of the details of FIG. 2. Referring to FIG. 3, the filler symbol 333 may be the same symbol as the last symbol 221 of the previous actual repetition 211 before the actual repetition 213 of the data 121, or the first symbol 225 of the next actual repetition 215 after the actual repetition 213 of the data 121. In addition, the filler symbol 333 is generated at a location in time that is the same as a location in time for the orphan symbol 223.

In some examples, when the last symbol 221 of the previous actual repetition 211 before the actual repetition 213 is also an orphan symbol, the filler symbol 333 may be based on a last symbol of a latest PUSCH repetition Type B transmission that has more than one symbols before the PUSCH repetition Type B transmission. Similarly, when the first symbol 225 of the next actual repetition 215 after the actual repetition 213 is also an orphan symbol, the filler symbol 333 may be based on a first symbol of an earliest PUSCH repetition Type B transmission that has more than one symbols after the PUSCH repetition Type B transmission. In some examples, the filler symbol 333 may be a cyclic prefix symbol, or a symbol determined by the UE 105.

In addition, the filler symbol 333 may be transmitted at a frequency location that is the same as a frequency location for the last symbol 221 of the previous actual repetition 211, a frequency location for the last symbol of the latest PUSCH repetition Type B transmission, a frequency location for the first symbol 225 of the next actual repetition 215, or a frequency location for the first symbol of the earliest PUSCH repetition Type B transmission. Furthermore, the filler symbol 333 may be transmitted having a transmission power that is the same as a repetition power for the last symbol 221 of the previous actual repetition 211, a transmission power for the last symbol of the latest PUSCH repetition Type B transmission, a transmission power for the first symbol of the earliest PUSCH repetition Type B transmission, or a transmission power for the first symbol 225 of the next actual repetition 215.

Afterwards, the UE 105 transmits the multiple actual repetitions, e.g., the actual repetition 211, the actual repetition 213 including the filler symbol 333 instead of the orphan symbol 223, and the actual repetition 215 to the base station 101 over the unlicensed spectrum. Together, the actual repetition 211, the actual repetition 213, and the actual repetition 215 are equivalent to the transmission of the nominal repetition 207 and the nominal repetition 209. The transmissions of the one or more nominal repetitions, e.g., the nominal repetition 207 and the nominal repetition 209 of the data 121 are physical uplink shared channel (PUSCH) repetition Type B transmissions of the data.

Figure 4:
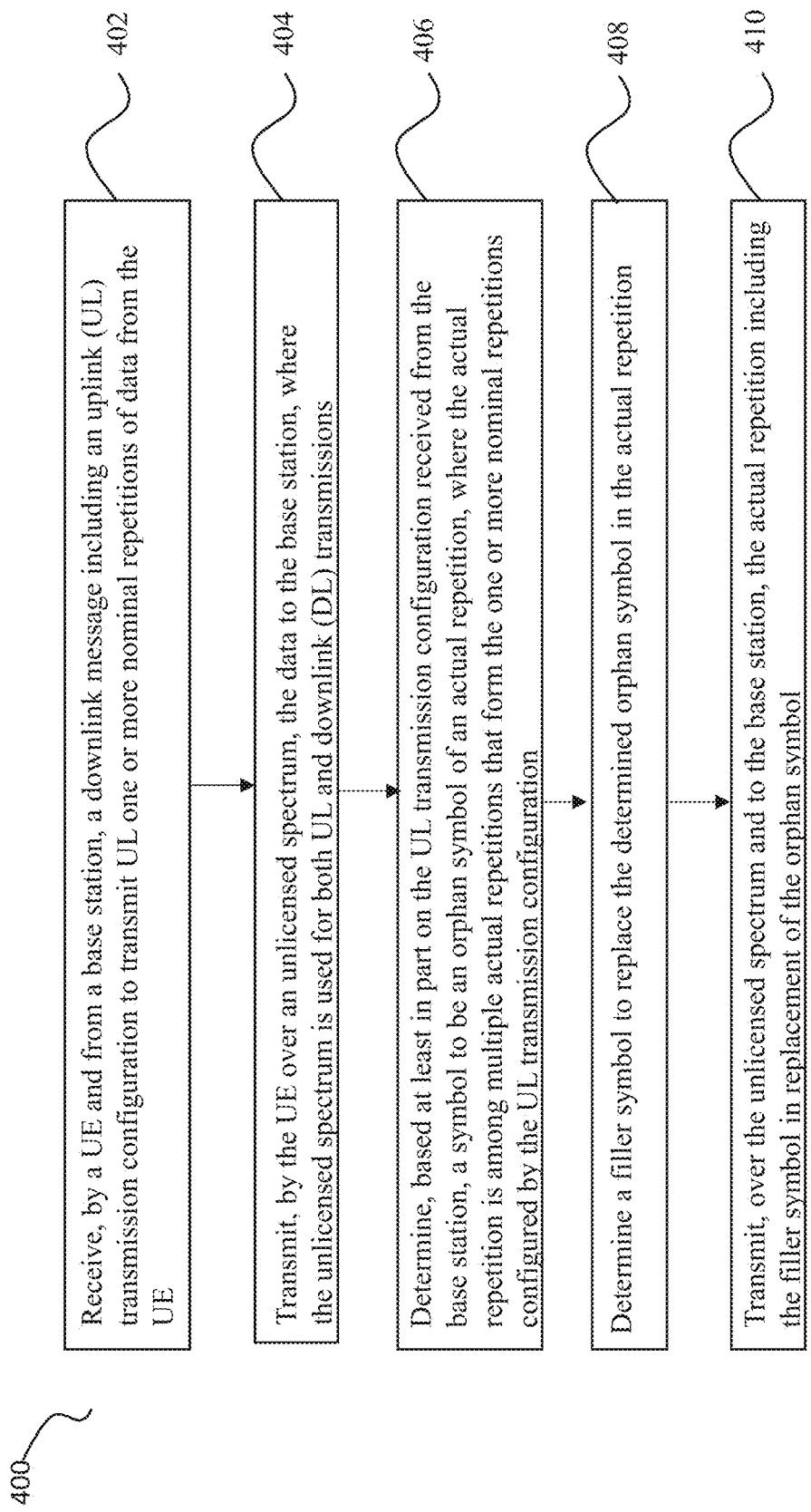
FIG. 4 illustrates an example method for a system (for example a user equipment (UE)) supporting mechanisms for implementing designs for transmission of nominal repetitions of data over an unlicensed spectrum, according to some aspects of the disclosure.

FIG. 4 illustrates an example method 400 for a system (for example a UE) supporting mechanisms for implementing designs for transmission of nominal repetitions of data over an unlicensed spectrum, according to some aspects of the disclosure. As a convenience and not a limitation, FIG. 4 may be described with regard to elements of FIGS. 1-3, 6, and 7. Method 400 may represent the operation of an electronic device (for example, UE 105 of FIG. 1) implementing mechanisms for transmission of nominal repetitions of data over an unlicensed spectrum. Method 400 may also be performed by system 600 of FIG. 6 and/or computer system 700 of FIG. 7. But method 400 is not limited to the specific aspects depicted in those figures and other systems may be used to perform the method as will be understood by those skilled in the art. It is to be appreciated that not all operations may be needed, and the operations may not be performed in the same order as shown in FIG. 4.

At 402, a UE receives from a base station a downlink message including an UL transmission configuration to transmit UL one or more nominal repetitions of data from the UE. For example, the UE 105 receives from the base station 101 the downlink message 102 including the UL transmission configuration 104 to transmit UL one or more nominal repetitions of data from the UE 105, as described for FIG. 1. In some examples, the UL transmissions may be PUSCH repetition Type B transmissions. The UL transmission configuration may be based at least in part on a radio resource control (RRC) signaling to configure a time domain resource allocation for the UE, based at least in part on an activation downlink control information (DCI), or based at least in part on Medium access control (MAC) Control Element (MAC CE) signaling. When the UL transmission configuration is a Type 1 configured grant, the RRC signaling alone is used to configure the time domain resource allocation for the UE. Additionally and alternatively, when the UL transmission configuration is a Type 2 configured grant, the RRC signaling together with DCI activation is used to configure the time domain resource allocation for the UE. Similarly, the RRC signaling together with the MAC CE signaling may be used to configure the time domain resource allocation for the UE, or the RRC signaling together with the MAC CE signaling and dynamic signaling from the DCI activation may be used to configure the time domain resource allocation for the UE.

At 404, a UE transmits the data to the base station over an unlicensed spectrum, where the unlicensed spectrum is used for both UL and DL transmissions. For example, the UE 105 transmits the data 121 to the base station 101 over an unlicensed spectrum, where the unlicensed spectrum is used for both UL and DL transmissions, as described for FIG. 1.

At 406, a UE determines, based at least in part on the UL transmission configuration received from the base station, a symbol to be an orphan symbol of an actual repetition. The actual repetition is among multiple actual repetitions that form the one or more nominal repetitions configured by the UL transmission configuration. For example, as shown in FIG. 2, based on the UL transmission configuration 104 received from the base station 101, the UE 105 determines the symbol 223 to be an orphan symbol of the actual repetition 213. The actual repetition 213 is among multiple actual repetitions, e.g., the actual repetition 211, the actual repetition 213, and the actual repetition 215, that form the nominal repetition 207 and the nominal repetition 209. An orphan symbol is contained in an actual repetition of size of one symbol, where the actual repetition is a part of a nominal repetition when the nominal repetition is segmented into multiple actual repetitions. Transmission of a nominal repetition of data is to re-send the same data that has been transmitted already for various purposes, e.g., to improve reliability. For example, the UE 105 identifies the orphan symbol 223 of the actual repetition 213, as described for FIG. 2.

At 408, a UE determine a filler symbol to replace the determined orphan symbol in the actual repetition. For example, the UE 105 determines the filler symbol 333 to replace the orphan symbol 223 of the actual repetition 213, as described for FIG. 3.

At 410, a UE transmits the actual repetition including the filler symbol in replacement of the orphan symbol over the unlicensed spectrum to the base station. For example, the UE 105 transmits the actual repetition 213 including the filler symbol 333 in replacement of the orphan symbol 223 to the base station 101 over the unlicensed spectrum, as described for FIG. 1. The actual repetition 213 includes the filler symbol 333 instead of the orphan symbol 223.

Figure 5:
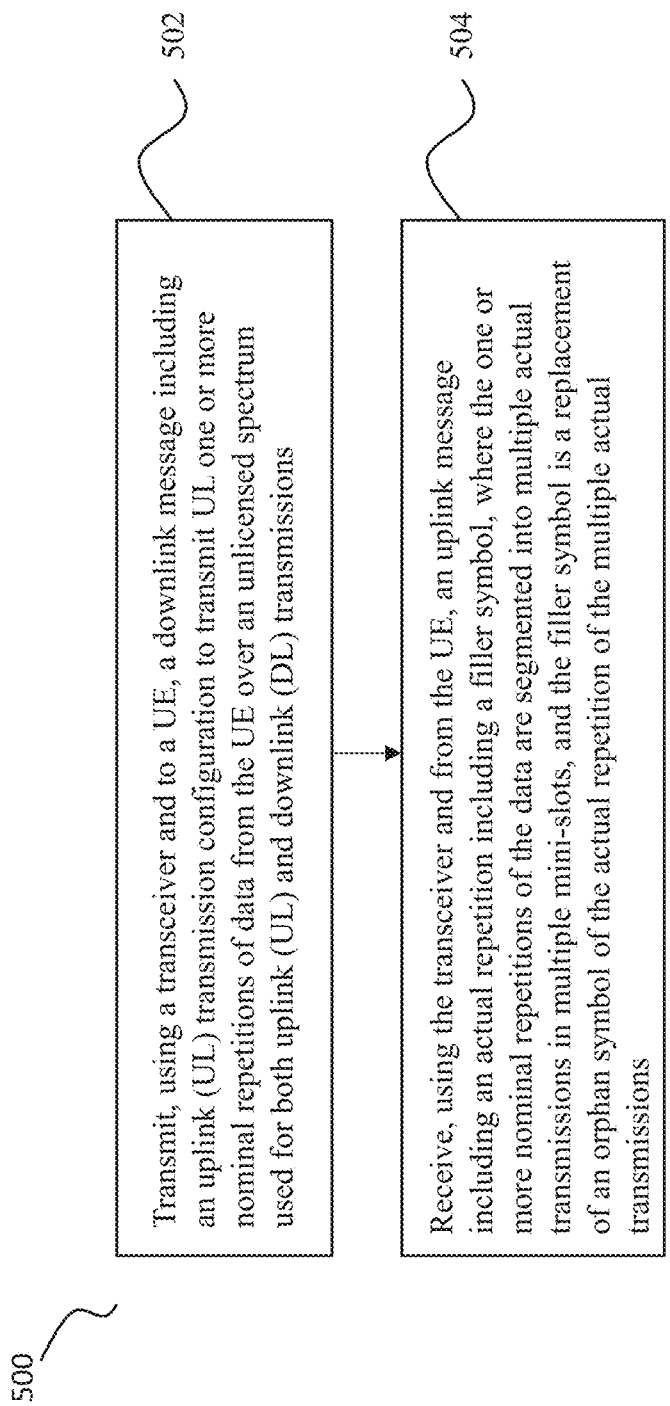
FIG. 5 illustrates an example method for a system (for example a base station) supporting mechanisms for implementing designs for transmission of nominal repetitions of data over an unlicensed spectrum, according to some aspects of the disclosure.

FIG. 5 illustrates an example method 500 for a system (for example a base station) supporting mechanisms for implementing designs for transmission of nominal repetitions of data over an unlicensed spectrum, according to some aspects of the disclosure. As a convenience and not a limitation, FIG. 5 may be described with regard to elements of FIGS. 1-3, 6, and 7. Method 500 may represent the operation of an electronic device (for example, base station 101 of FIG. 1) implementing mechanisms for transmission of nominal repetitions of data over an unlicensed spectrum. Method 500 may also be performed by system 600 of FIG. 6 and/or computer system 700 of FIG. 7. But method 500 is not limited to the specific aspects depicted in those figures and other systems may be used to perform the method as will be understood by those skilled in the art. It is to be appreciated that not all operations may be needed, and the operations may not be performed in the same order as shown in FIG. 5.

At 502, a base station transmits, using a transceiver and to a UE, a downlink message including an UL transmission configuration to transmit UL one or more nominal repetitions of data from the UE over an unlicensed spectrum used for both UL and DL transmissions. For example, the base station 101 transmits, using a transceiver and to the UE 105, the downlink message 102 including the UL transmission configuration 104. The UL transmission configuration 104 is for the UE 105 to transmit UL the nominal repetition 207 and the nominal repetition 209, as described for FIGS. 1-2.

At 504, a base station receives, using the transceiver and from the UE, an actual repetition including a filler symbol. The one or more nominal repetitions are segmented into multiple actual transmissions, e.g., and the filler symbol is a replacement of an orphan symbol of the actual repetition of the multiple actual transmissions. For example, as described for FIGS. 1-3, the base station 101 receives from the UE 105 the actual repetition 213 including the filler symbol 333. The nominal repetition 207 and the nominal repetition 209 are segmented into multiple actual transmissions. e.g., the actual repetition 211, the actual repetition 213, and the actual repetition 215. The filler symbol 333 is a replacement of the orphan symbol 223 of the actual repetition 213.

FIG. 6 illustrates a block diagram of an example system 600 of an electronic device implementing designs for transmission of nominal repetitions of data over an unlicensed spectrum, according to some aspects of the disclosure. System 600 may be any of the electronic devices (e.g., the base station 101, the UE 105) of system 100. The system 600 includes a processor 610, one or more transceivers 620, communication infrastructure 640, memory 650, operating system 652, application 654, and one or more antenna 660. Illustrated systems are provided as exemplary parts of system 600, and system 600 can include other circuit(s) and subsystem(s). Also, although the systems of system 600 are illustrated as separate components, the aspects of this disclosure can include any combination of these, less, or more components.

Memory 650 may include random access memory (RAM) and/or cache, and may include control logic (e.g., computer software) and/or data. Memory 650 may include other storage devices or memory such as, but not limited to, a hard disk drive and/or a removable storage device/unit. According to some examples, operating system 652 can be stored in memory 650. Operating system 652 can manage transfer of data from memory 650 and/or one or more applications 654 to processor 610 and/or one or more transceivers 620. In some examples, operating system 652 maintains one or more network protocol stacks (e.g., Internet protocol stack, cellular protocol stack, and the like) that can include a number of logical layers. At corresponding layers of the protocol stack, operating system 652 includes control mechanism and data structures to perform the functions associated with that layer.

According to some examples, application 654 can be stored in memory 650. Application 654 can include applications (e.g., user applications) used by wireless system 600 and/or a user of wireless system 600. The applications in application 654 can include applications such as, but not limited to, Siri™, FaceTime™, radio streaming, video streaming, remote control, and/or other user applications.

System 600 can also include communication infrastructure 640. Communication infrastructure 640 provides communication between, for example, processor 610, one or more transceivers 620, and memory 650. In some implementations, communication infrastructure 640 may be a bus. Processor 610 together with instructions stored in memory 650 performs operations enabling system 600 to implement mechanisms for transmission of nominal repetitions of data over an unlicensed spectrum, as described herein for the system 100 as shown in FIGS. 1-3.

One or more transceivers 620 transmit and receive communications signals that support mechanisms for transmission of nominal repetitions of data over an unlicensed spectrum. According to some aspects, one or more transceivers 620 may be coupled to antenna 660. Antenna 660 may include one or more antennas that may be the same or different types. One or more transceivers 620 allow system 600 to communicate with other devices that may be wired and/or wireless. In some examples, one or more transceivers 620 can include processors, controllers, radios, sockets, plugs, buffers, and like circuits/devices used for connecting to and communication on networks. According to some examples, one or more transceivers 620 include one or more circuits to connect to and communicate on wired and/or wireless networks.

According to some aspects of this disclosure, one or more transceivers 620 can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 620 can include more or fewer systems for communicating with other devices.

In some examples, one or more transceivers 620 can include one or more circuits (including a WLAN transceiver) to enable connection(s) and communication over WLAN networks such as, but not limited to, networks based on standards described in IEEE 802.11.

Additionally, or alternatively, one or more transceivers 620 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, one or more transceivers transceiver 620 can include a Bluetooth™ transceiver.

Additionally, one or more transceivers 620 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220 can be configured to operate according to one or more of Rel-15, Rel-16, Rel-17, or later of 3GPP standard.

According to some aspects of this disclosure, processor 610, alone or in combination with computer instructions stored within memory 650, and/or one or more transceiver 620, implements the methods and mechanisms discussed in this disclosure. For example, processor 610, alone or in combination with computer instructions stored within memory 650, and/or one or more transceiver 620, implements mechanisms for transmission of nominal repetitions of data over an unlicensed spectrum. According to some aspects of this disclosure, processor 610, alone or in combination with computer instructions stored within memory 650, and/or one or more transceiver 620, can receive from a base station (for example base station 101 of FIG. 1) the downlink message 102 including an UL transmission configuration 104 to transmit UL one or more nominal repetitions of data from the UE 105. The processor 610 can transmit the data 121 over the unlicensed spectrum to the base station 101. Furthermore, the processor 610 can generate one or more nominal repetitions of the data, e.g., the nominal repetition 207 and the nominal repetition 209, to be transmitted over the unlicensed spectrum. The nominal repetition 207 and the nominal repetition 209 are segmented into multiple actual repetitions, e.g., the actual repetition 211, the actual repetition 213, and the actual repetition 215. The processor 610 can identify the orphan symbol 223 of the actual repetition 213, and determine the filler symbol 333 to replace the orphan symbol 223 of the actual repetition 203. The processor 610 can further transmit the actual repetition 211, the actual repetition 215, and the actual repetition 213 including the filler symbol 333 instead of the orphan symbol 223 to the base station 101 over the unlicensed spectrum.

Various aspects can be implemented, for example, using one or more computer systems, such as computer system 700 shown in FIG. 7. Computer system 700 can be any well-known computer capable of performing the functions described herein such as devices 101, 105 of FIG. 1, or 600 of FIG. 6. Computer system 700 includes one or more processors (also called central processing units, or CPUs), such as a processor 704. Processor 704 is connected to a communication infrastructure 706 (e.g., a bus). Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some aspects, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 708, the removable storage unit 718, the removable storage unit 722 can store instructions that, when executed by processor 704, cause processor 704 to perform operations for a UE, e.g., the UE 105, or a base station. e.g., the base station 101. In some examples, the operations include receiving a downlink message including an UL transmission configuration from the base station 101 to transmit UL one or more nominal repetitions of data from the UE 105; transmitting the data to the base station over an unlicensed spectrum used for both UL and DL transmissions; generating the one or more nominal repetitions of the data to be transmitted over the unlicensed spectrum. The one or more nominal repetitions of the data are segmented into multiple actual repetitions. The operations further include identifying an orphan symbol of an actual repetition of a generated nominal repetition of the data; determining a filler symbol to replace the orphan symbol of the actual repetition; and transmitting the multiple actual repetitions including the filler symbol instead of the orphan symbol to the base station over the unlicensed spectrum.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments or examples, at least one of the components set forth in one or more of the preceding figures may be configured to perform one or more operations, techniques, processes, and/or methods as set forth in the example section below. For example, circuitry associated with a UE, base station, network element, etc. as described above in connection with one or more of the preceding figures may be configured to operate in accordance with one or more of the examples set forth below in the example section.

EXAMPLES

Example 1 includes a user equipment (UE), comprising: a transceiver configured to wirelessly communicate with a base station; and a processor communicatively coupled to the transceiver and configured to: determine, based at least in part on a nominal repetition configuration received from the base station, a symbol is an orphan symbol in a physical uplink shared channel (PUSCH) repetition Type B transmission in a Time Division Duplexing (TDD) New Radio (NR) communication system; determine a filler symbol to replace the determined orphan symbol in the PUSCH repetition Type B transmission; and generate the PUSCH repetition Type B transmission including the filler symbol.

Example 2 includes the UE of example 1 and/or some other example herein, wherein the nominal repetition configuration is based at least in part on a radio resource control (RRC) signaling to configure a time domain resource allocation for the UE, based at least in part on an activation downlink control information (DCI), or based at least in part on Medium access control (MAC) Control Element (MAC CE) signaling.

Example 2 includes the UE of example 1 and/or some other example herein, wherein to generate the PUSCH repetition Type B transmission including the filler symbol is to generate the PUSCH repetition Type B transmission including the filler symbol at a location in time that is the same as a location in time for the orphan symbol.

Example 4 includes the UE of example 1 and/or some other example herein, wherein the processor is further configured to determine the filler symbol based on a last symbol of a latest PUSCH repetition Type B transmission that has more than one symbols before the PUSCH repetition Type B transmission, a first symbol of an earliest PUSCH repetition Type B transmission that has more than one symbols after the PUSCH repetition Type B transmission, a cyclic prefix symbol, or a symbol determined by the UE.

Example 5 includes the UE of example 4 and/or some other example herein, wherein the filler symbol is transmitted at a frequency location that is the same as a frequency location for the last symbol of the latest PUSCH repetition Type B transmission, or a frequency location for the first symbol of the earliest PUSCH repetition Type B transmission.

Example 6 includes the UE of example 4 and/or some other example herein, wherein the filler symbol is transmitted having a transmission power that is the same as a transmission power for the last symbol of the latest PUSCH repetition Type B transmission, or a transmission power for the first symbol of the earliest PUSCH repetition Type B transmission.

Example 7 includes the UE of example 1 and/or some other example herein, wherein to determine the symbol is the orphan symbol is to determine the symbol is a single symbol to be transmitted in the PUSCH repetition Type B transmission according to the nominal repetition configuration, or a single UL symbol to be omitted from transmission in the PUSCH repetition Type B transmission.

Example 8 includes the UE of example 1 and/or some other example herein, wherein the orphan symbol is determined by a boundary of a slot or a switching point within the slot next to a downlink (DL) transmission defined by a subframe indicator (SFI) or by an Invalid Symbol Pattern.

Example 9 includes the UE of example 8 and/or some other example herein, wherein the SFI is a semi-static configuration or a dynamic configuration, and wherein a symbol of the slot is defined as a UL symbol for UL transmission, a DL symbol for DL transmission, or a flexible symbol to be used for either UL transmission or DL transmission.

Example 10 includes the UE of example 8 and/or some other example herein, wherein the Invalid Symbol Pattern is a semi-static configuration or a semi-static configuration indicated by dynamic signaling, and wherein a symbol of a bitmap from the Invalid Symbol Pattern marked in "I" is defined as a symbol unavailable for UL transmission.

Example 11 includes the UE of example 1 and/or some other example herein, wherein the processor is further configured to transmit the PUSCH repetition Type B transmission in an unlicensed spectrum, and wherein the unlicensed spectrum is a standalone NR unlicensed spectrum supporting ultra-reliable low-latency communication (URLLC) with synchronized Frame Based Equipment (FBE) based sharing in controlled environments.

Example 12 includes a method for a user equipment (UE), comprising: transmitting data over an unlicensed spectrum to a base station in a Time Division Duplexing (TDD) New Radio (NR) communication system, wherein the unlicensed spectrum is used for both uplink (UL) and downlink (DL) transmissions; determining, based at least in part on an UL transmission configuration received from the base station, a symbol to be an orphan symbol in a physical uplink shared channel (PUSCH) repetition Type B transmission; determining a filler symbol to replace the determined orphan symbol in the PUSCH repetition Type B transmission; and generating the PUSCH repetition Type B transmission including the filler symbol.

Example 13 includes the method of example 12 and/or some other example herein, wherein the filler symbol is selected from a last symbol of a latest PUSCH repetition Type B transmission that has more than one symbols before the PUSCH repetition Type B transmission, a first symbol of an earliest PUSCH repetition Type B transmission that has more than one symbols after the PUSCH repetition Type B transmission, a cyclic prefix symbol, or a symbol determined by the UE.

Example 14 includes the method of example 13 and/or some other example herein, wherein the filler symbol is transmitted at a frequency location that is the same as a frequency location for the last symbol of the latest PUSCH repetition Type B transmission, or a frequency location for the first symbol of the earliest PUSCH repetition Type B transmission.

Example 15 includes the method of example 13 and/or some other example herein, wherein the UL transmission configuration is based at least in part on a radio resource control (RRC) signaling to configure a time domain resource allocation for the UE, based at least in part on an activation downlink control information (DCI), or based at least in part on Medium access control (MAC) Control Element (MAC CE) signaling.

Example 16 includes the method of example 15 and/or some other example herein, wherein the UL transmission configuration is a Type 1 configured grant, and the RRC signaling alone is used to configure the time domain resource allocation for the UE; wherein the UL transmission configuration is a Type 2 configured grant, and the RRC signaling together with the DCI activation is used to configure the time domain resource allocation for the UE; wherein the RRC signaling together with the MAC CE signaling is used to configure the time domain resource allocation for the UE; or wherein the RRC signaling together with the MAC CE signaling and dynamic signaling from the DCI activation is used to configure the time domain resource allocation for the UE.

Example 17 includes a non-transitory computer-readable medium storing instructions that, when executed by a processor of a user equipment (UE), cause the processor to perform operations, the operations comprising: receiving, by the UE and from a base station, a downlink message including an uplink (UL) transmission configuration to transmit UL one or more nominal repetitions from the UE; transmitting, by the UE over an unlicensed spectrum, data to the base station; determining, based at least in part on the UL transmission configuration received from the base station, a symbol to be an orphan symbol of an actual repetition; determining a filler symbol to replace the determined orphan symbol in the actual repetition, wherein the actual repetition is among multiple actual repetitions that form the one or more nominal repetitions configured by the UL transmission configuration; and transmitting, over the unlicensed spectrum and to the base station, the actual repetition including the filler symbol in replacement of the orphan symbol.

Example 18 includes the non-transitory computer-readable medium of example 17 and/or some other example herein, wherein transmission of the actual repetition from the UE is a physical uplink shared channel (PUSCH) repetition Type B transmission.

Example 19 includes the non-transitory computer-readable medium of example 17 and/or some other example herein, wherein the orphan symbol is determined by a boundary of the slot or a switching point within the slot next to a DL transmission defined by a subframe indicator (SFI) or by an Invalid Symbol Pattern.

Example 20 includes the non-transitory computer-readable medium of example 17 and/or some other example herein, wherein the unlicensed spectrum is a standalone new radio (NR) unlicensed spectrum supporting ultra-reliable low-latency communication (URLLC) with synchronized Frame Based Equipment (FBE) based sharing in controlled environments.

Example 21 includes a base station, comprising: a transceiver configured to communicate with a user equipment (UE); and a processor communicatively coupled to the transceiver and configured to: transmit, using the transceiver and to the UE, a downlink message including an uplink (UL) transmission configuration to transmit UL one or more nominal repetitions from the UE over an unlicensed spectrum in a Time Division Duplexing (TDD) New Radio (NR) communication system; and receive, using the transceiver and from the UE, a physical uplink shared channel (PUSCH) repetition Type B transmission including a filler symbol, wherein the filler symbol is a replacement of an orphan symbol of the PUSCH repetition Type B transmission, and the PUSCH repetition Type B transmission is among multiple PUSCH repetition Type B transmissions that form the one or more nominal repetitions configured by the UL transmission configuration.

Example 22 includes the base station of example 21 and/or some other example herein, wherein the UL transmission configuration is based at least in part on a radio resource control (RRC) signaling to configure a time domain resource allocation for the UE, based at least in part on an activation downlink control information (DCI), or based at least in part on Medium access control (MAC) Control Element (MAC CE) signaling.

Example 23 includes the base station of example 21 and/or some other example herein, wherein the filler symbol is selected from a last symbol of a latest PUSCH repetition Type B transmission that has more than one symbols before the PUSCH repetition Type B transmission, a first symbol of an earliest PUSCH repetition Type B transmission that has more than one symbols after the PUSCH repetition Type B transmission, a cyclic prefix symbol, or a symbol determined by the UE; wherein the filler symbol is transmitted at a frequency location that is the same as a frequency location for the last symbol of the latest PUSCH repetition Type B transmission, or a frequency location for the first symbol of the earliest PUSCH repetition Type B transmission; and wherein the filler symbol is transmitted having a transmission power that is the same as a transmission power for the last symbol of the latest PUSCH repetition Type B transmission, or a transmission power for the first symbol of the earliest PUSCH repetition Type B transmission.

Example 24 includes a user equipment (UE), comprising: a transceiver configured to wirelessly communicate with a base station, and a processor communicatively coupled to the transceiver and configured to: determine, based at least in part on an uplink (UL) transmission configuration from the base station, a symbol to be an orphan symbol of an actual repetition; determine a filler symbol to replace the determined orphan symbol in the actual repetition; and generate the actual repetition including the filler symbol.

Example 25 includes the UE of example 24 and/or some other example herein, wherein the UL transmission configuration is based at least in part on a radio resource control (RRC) signaling to configure a time domain resource allocation for the UE, based at least in part on an activation downlink control information (DCI), or based at least in part on Medium access control (MAC) Control Element (MAC CE) signaling.

Example 26 includes the UE of example 24 and/or some other example herein, wherein the transmission of the actual repetition from the UE is a physical uplink shared channel (PUSCH) repetition Type B transmission in a Time Division Duplexing (TDD) New Radio (NR) communication system.

What is claimed is:

1. A user equipment (UE), comprising:
a transceiver configured to wirelessly communicate with a base station; and
a processor communicatively coupled to the transceiver and configured to:
determine, based at least in part on a nominal repetition configuration received from the base station, a single symbol is an orphan symbol in a physical uplink shared channel (PUSCH) repetition Type B transmission in a Time Division Duplexing (TDD) New Radio (NR) communication system, wherein the orphan symbol is contained in a first actual repetition of size of one symbol that is either an uplink symbol or a flexible symbol, and the first actual repetition is a part of a nominal repetition that is segmented into multiple actual repetitions including the first actual repetition having the orphan symbol and a second actual repetition having multiple consecutive symbols separated from the first actual repetition by one or more downlink symbols defined by a subframe indicator (SFI) or an invalid symbol pattern;
determine a filler symbol to replace the orphan symbol in the PUSCH repetition Type B transmission; and
generate the PUSCH repetition Type B transmission including the filler symbol.

2. The UE of claim 1, wherein the nominal repetition configuration is based at least in part on a radio resource control (RRC) signaling to configure a time domain resource allocation for the UE, based at least in part on an activation downlink control information (DCI), or based at least in part on Medium Access Control (MAC) Control Element (MAC CE) signaling.

3. The UE of claim 1, wherein to generate the PUSCH repetition Type B transmission including the filler symbol is to generate the PUSCH repetition Type B transmission including the filler symbol at a location in time that is the same as a location in time for the orphan symbol.

4. The UE of claim 1, wherein the processor is further configured to determine the filler symbol based on a last symbol of a latest PUSCH repetition Type B transmission that has more than one symbols before the PUSCH repetition Type B transmission, a first symbol of an earliest PUSCH repetition Type B transmission that has more than one symbols after the PUSCH repetition Type B transmission, a cyclic prefix symbol, or a symbol determined by the UE.

5. The UE of claim 4, wherein the filler symbol is transmitted at a frequency location that is the same as a frequency location for the last symbol of the latest PUSCH repetition Type B transmission, or a frequency location for the first symbol of the earliest PUSCH repetition Type B transmission.

6. The UE of claim 4, wherein the filler symbol is transmitted having a transmission power that is the same as a transmission power for the last symbol of the latest PUSCH repetition Type B transmission, or a transmission power for the first symbol of the earliest PUSCH repetition Type B transmission.

7. The UE of claim 1, wherein to determine the single symbol is the orphan symbol is to determine the single symbol is to be transmitted in the PUSCH repetition Type B transmission according to the nominal repetition configuration, or a single UL symbol to be omitted from transmission in the PUSCH repetition Type B transmission.

8. The UE of claim 1, wherein the orphan symbol is determined by a boundary of a slot, or a switching point within the slot next to a downlink (DL) transmission defined by the SFI or by the invalid symbol pattern.

9. The UE of claim 8, wherein the SFI is a semi-static configuration or a dynamic configuration, and wherein a symbol of the slot is defined as a UL symbol for UL transmission, a DL symbol for DL transmission, or the flexible symbol to be used for either UL transmission or DL transmission.

10. The UE of claim 8, wherein the Invalid Symbol Pattern is a semi-static configuration or a semi-static configuration indicated by dynamic signaling, and wherein a symbol of a bitmap from the Invalid Symbol Pattern marked in "1" is defined as a symbol unavailable for UL transmission.

11. The UE of claim 1, wherein the processor is further configured to transmit, via the transceiver, the PUSCH repetition Type B transmission including the filler symbol to the base station.

12. A method for a user equipment (UE), comprising:
transmitting data over an unlicensed spectrum to a base station in a Time Division Duplexing (TDD) New Radio (NR) communication system, wherein the unlicensed spectrum is used for both uplink (UL) and downlink (DL) transmissions;
determining, based at least in part on an UL transmission configuration received from the base station, a symbol to be an orphan symbol in a physical uplink shared channel (PUSCH) repetition Type B transmission, wherein the orphan symbol is contained in a first actual repetition of size of one symbol that is either an uplink symbol or a flexible symbol, and the first actual repetition is a part of a nominal repetition that is segmented into multiple actual repetitions including the first actual repetition having the orphan symbol and a second actual repetition having multiple consecutive symbols separated from the first actual repetition by one or more downlink symbols defined by a subframe indicator (SFI) or an invalid symbol pattern;
determining a filler symbol to replace the orphan symbol in the PUSCH repetition Type B transmission; and
generating the PUSCH repetition Type B transmission including the filler symbol.

13. The method of claim 12, wherein the filler symbol is selected from a last symbol of a latest PUSCH repetition Type B transmission that has more than one symbols before the PUSCH repetition Type B transmission, a first symbol of an earliest PUSCH repetition Type B transmission that has more than one symbols after the PUSCH repetition Type B transmission, a cyclic prefix symbol, or a symbol determined by the UE.

14. The method of claim 13, wherein the filler symbol is transmitted at a frequency location that is the same as a frequency location for the last symbol of the latest PUSCH repetition Type B transmission, or a frequency location for the first symbol of the earliest PUSCH repetition Type B transmission.

15. The method of claim 13, wherein the UL transmission configuration is based at least in part on a radio resource control (RRC) signaling to configure a time domain resource allocation for the UE, based at least in part on an activation downlink control information (DCI), or based at least in part on Medium access control (MAC) Control Element (MAC CE) signaling.

16. The method of claim 15, wherein the UL transmission configuration is a Type 1 configured grant, and the RRC signaling alone is used to configure the time domain resource allocation for the UE;
wherein the UL transmission configuration is a Type 2 configured grant, and the RRC signaling together with the activation DCI is used to configure the time domain resource allocation for the UE;
wherein the RRC signaling together with the MAC CE signaling is used to configure the time domain resource allocation for the UE; or
wherein the RRC signaling together with the MAC CE signaling and dynamic signaling from the activation DCI is used to configure the time domain resource allocation for the UE.

17. A non-transitory computer-readable medium storing instructions that, when executed by a processor of a user equipment (UE), cause the processor to perform operations, the operations comprising:
receiving, by the UE and from a base station, a downlink message including an uplink (UL) transmission configuration to transmit UL one or more nominal repetitions from the UE;
transmitting, by the UE over an unlicensed spectrum, data to the base station, wherein the unlicensed spectrum is used for both UL and downlink (DL) transmissions;
determining, based at least in part on the UL transmission configuration received from the base station, a symbol to be an orphan symbol of a first actual repetition of size of one symbol that is either an uplink symbol or a flexible symbol, and wherein the first actual repetition is a part of a nominal repetition that is segmented into multiple actual repetitions including the first actual repetition having the orphan symbol and a second actual repetition having multiple consecutive symbols separated from the first actual repetition by one or more downlink symbols defined by a subframe indicator (SFI) or an invalid symbol pattern;
determining a filler symbol to replace the orphan symbol in the first actual repetition; and
transmitting, over the unlicensed spectrum and to the base station, the first actual repetition including the filler symbol in replacement of the orphan symbol.

18. The non-transitory computer-readable medium of claim 17, wherein transmission of the actual repetition from the UE is a physical uplink shared channel (PUSCH) repetition Type B transmission.

19. The non-transitory computer-readable medium of claim 17, wherein the orphan symbol is determined by a boundary of the slot, or a switching point within the slot next to a DL transmission defined by a subframe indicator (SFI) or by an Invalid Symbol Pattern.

20. The non-transitory computer-readable medium of claim 17, wherein the unlicensed spectrum is a standalone new radio (NR) unlicensed spectrum supporting ultra-reliable low-latency communication (URLLC) with synchronized Frame Based Equipment (FBE) based sharing in controlled environments.

\* \* \* \* \*